United States Patent

Allington et al.

[15] 3,663,276

[45] May 16, 1972

[54] METHOD OF ADJUSTING THE RESISTIVITY OF THICK-FILM SCREEN-PRINTED RESISTORS

[72] Inventors: Trevor Richard Allington; James Richard McClellan, both of Indianapolis, Ind.

[73] Assignee: RCA Corporation

[22] Filed: May 25, 1970

[21] Appl. No.: 40,091

[52] U.S. Cl. ..............................117/201, 117/212, 117/221, 117/227, 252/512

[51] Int. Cl. ........................B44d 1/18, B44d 1/02, H01b 1/02

[58] Field of Search ..................117/201, 212, 221, 227, 229; 252/512, 514, 518, 520, 521

[56] References Cited

UNITED STATES PATENTS

| | | | |
|---|---|---|---|
| 3,252,831 | 5/1966 | Ragan | 252/514 X |
| 2,886,476 | 5/1959 | Dumesnil et al. | 117/212 |
| 2,950,995 | 8/1960 | Place, Sr. et al. | 117/229 X |
| 2,950,996 | 8/1960 | Place, Sr. et al. | 117/23 X |
| 3,484,284 | 12/1969 | Dates et al. | 117/221 |
| 3,539,392 | 11/1970 | Cockbain | 117/227 |
| 3,052,573 | 9/1962 | Dumesnil | 117/221 |

*Primary Examiner*—Alfred L. Leavitt
*Assistant Examiner*—Kenneth P. Glynn
*Attorney*—Glenn H. Bruestle

[57] ABSTRACT

Method of adjusting the resistivity of a thick-film resistor of the type made by screen printing on a substrate a composition comprising metal particles, glass frit, a temporary organic binder and a temporary solvent, drying to remove the solvent, and firing the composition to fuse the glass frit and burn off the binder, said method comprising determining the relationship between the resistivity of the fired composition and the drying time that elapses between screen printing the composition on the substrate and the beginning of the firing cycle, and setting this elapsed time in accordance with a desired resistivity value.

5 Claims, 1 Drawing Figure

PATENTED MAY 16 1972 3,663,276
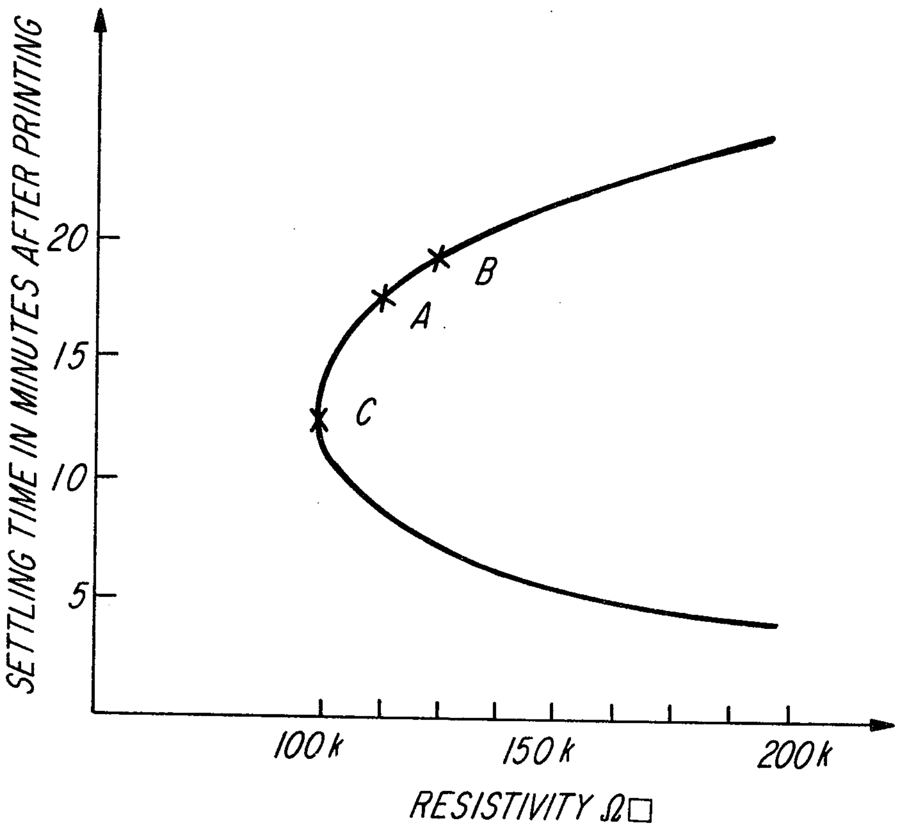
INVENTORS
Trevor R. Allington &
James R. McClellan
BY W. S. Hill
AGENT

METHOD OF ADJUSTING THE RESISTIVITY OF THICK-FILM SCREEN-PRINTED RESISTORS

BACKGROUND OF THE INVENTION

One type of miniaturized hybrid electronic circuit is made by screen printing electrical conductors, resistors and sometimes capacitors and inductors on a ceramic substrate. Certain discrete components, such as transistors, diodes and ceramic chip capacitors, are mounted on terminal ends of some of the conductors.

The resistors may be made from a composition comprising metal particles, glass frit, a temporary resin binder and a temporary solvent. This composition is usually applied by screen printing a pattern on a ceramic substrate. Next, the printed pattern is dried and then it is fired to form glaze resistors. The dimension and shape of the deposited units of composition approximately determine the resistance value of the completed resistor. However, because there are many factors which enter into the exact value of resistance which will actually be obtained in any one resistor, the control of resistance values as fired, within acceptably close tolerances, is extremely difficult.

Some of the factors that affect the resistance value of the completed resistor are:

1. Exact composition of the ink. Small variations in percentage composition from batch to batch of the same ink cause considerable variations in resistance of the product.

2. Particle size variation from batch to batch of ink.

3. Variations in layer thickness of the screened-on resistor due to equipment wear.

4. Variations in dimensions of screened-on bodies due to equipment wear.

5. Variations in viscosity due to gradual evaporation of solvent during a long production run.

6. Viscosity changes also occur due to shearing effects which take place as the composition is worked.

Because of these and others of many variables that are always present in the manufacturing operation of making screen-printed resistors, manufacturers have found it impossible to accurately control output without resorting to correcting mechanically the completed resistor to bring it within an acceptable range of values. The correcting is usually done by abrading away a portion of the resistor, while monitoring the measured resistance value, to raise the value by a needed amount. Using this method, the resistance can only be increased — not decreased, although it is desirable to have a method that would permit either increase or decrease.

In the past, attempts have been made to lessen the necessity of mechanically correcting resistor values after the manufacture of the resistor is otherwise complete. These attempts have usually consisted of efforts to exert closer control over composition variables. These attempts have not met with much success.

OBJECTS OF THE INVENTION

It is therefore an object of the present invention to provide an improved method of manufacturing screen-printed resistors which will result in closer control of the fired resistance values.

Another object of the invention is to provide an improved method of adjusting the fired resistance values of screen-printed resistors during an intermediate stage of the manufacturing process, which method is compatible with mass production techniques and is low in cost.

THE DRAWING

The single FIGURE of the drawing is a curve of final resistivity of a fired resistor plotted against drying time between printing and firing for a particular glass frit type resistor ink.

SUMMARY OF THE INVENTION

Briefly, the method of the present invention is based on the discovery, by the present inventors, that the resistivity of a fired, screen-printed, glaze-type resistor varies in a regular, predictable manner with the length of the period between the time of printing of the wet composition and the beginning of the firing cycle. This has been found to be true especially with the high resistivity type (i.e., at least about 100,000 ohms/square) glass frit inks. All of the glass frit type resistor ink compositions that have been tested have evidenced the same type of characteristic changes in final, after-firing, resistivity in relation to drying time between printing and firing. That is, as drying time increases, at first the fired resistivity value drops rapidly; then a period is reached when resistivity drops very slowly with further increase in time. As drying time continues to increase, resistivity begins to rise, at first slowly and then more rapidly. An example of this characteristic is shown in the drawing.

DESCRIPTION OF PREFERRED EMBODIMENT

The resistivity-control method of the invention may be utilized as follows. Depending upon the resistivity desired in the resistor being made, which, in turn, depends upon the area available for this particular resistor, one of the commonly-used, commercially-available glass frit type resistor inks is selected and run through the normal sequence of steps leading to the making of one or more thick-film resistors as part of a particular hybrid circuit on an insulating substrate. These steps comprise:

a. Screen printing areas of the resistive ink bridging thick-film metal connection pads on a ceramic substrate, b. Drying the deposited composition areas for a carefully measured time, c. Running the substrates with the dried inks through a belt-type furnace having a heating profile designed to fire the inks with fusing of the glass frits, and d. Cooling the fired units down to room temperature.

However, in this case, samples are first run in which the drying time (step b) is varied between about 5 and 25 minutes. The resistivities of these samples are measured after "step d" and a curve is plotted like that shown in the drawing. This curve then serves the dual purpose of (1) helping to select the initial conditions to fire to a required resistivity, and (2) becoming a means for adjusting resistivity up or down to bring the resistors being made in the rest of the run back within acceptable tolerance limits if they begin drifting outside these limits.

It is preferable to further base the selection of the resistor ink on where the "flat" portion of the settling time vs. resistivity curve is located. That is, an ink should be selected for which the "flat" portion (i.e., point of minimum rate of change) of the curve falls close to the resistivity desired in the product.

After the samples have been made, the actual run is started using a drying time, read from the curve, which will result in the product resistivity desired.

As the run proceeds, due to changes such as changes in screen dimensions due to wear, and evaporation of solvent, monitored resistivities of the fired resistors will usually be found to be drifting away from the originally measured values. Depending upon the amount of drift and whether resistivity is increasing or decreasing, drying time is either decreased or increased to compensate for the drift.

For example, suppose, initially, that resistors are being made with a desired resistivity of 112,500 ohms/sq. (point A of the curve). This means that the operator could use a drying time of either 17.5 minutes (upper half of the curve), or 9 minutes (lower half of the curve). Let us suppose that, in this Example, he is using the upper half of the curve and is therefore using 17.5 minutes drying time.

As time goes on during the run, the resistivity of the product begins to change and the problem is to adjust conditions to compensate for the changes and bring the resistivity back to its initial value. Suppose the resistivity rises to 125,000 ohms/sq., for example. In accordance with the present invention, the operator notes that this corresponds to a change in drying time of about 2.5 minutes (point B on the curve). Since the operator also knows that to compensate for increased resistivity he should, in this instance, decrease the drying time, he drops the drying time down to 15 minutes.

It should also be noted that, if the operator had been working on the lower half of the curve and had first been using 9 minutes drying time, he would now use 2.5 minutes longer drying time to compensate for the resistivity change.

As another example, suppose the resistivity had dropped to 100,000 ohms/sq. during the run (point C on the curve). This corresponds to 12.5 minutes which also happens to be the point of minimum change on the curve. Here an increase of drying time of 5 minutes is called for if the operator is working on the upper half of the curve. If the lower half of the curve is being used, a decrease of 5 minutes in drying time is indicated.

As the curve indicates, it is possible to compensate for very large decreases in resistivity, for example, halving of resistivity values, by relatively large increases in drying time. However, usually the resistivity changes encountered during a day's manufacturing run will require small changes in time.

Resistor inks which may typically be used in the method of the present invention may, for example, contain the following percentages of metals:

Percent of Dry Weight

| | |
|---|---|
| Silver | about 10% |
| Palladium | 15–40% |
| Zirconium | about 1% |
| Calcium | 0.02–2% |
| Zinc | 10–15% |
| Boron | 2–3% |
| Silicon | 2–10% |
| Lead | 1–3% |
| Aluminum | 2–3% |

These figures have been obtained by emission spectrographic analysis of a number of commercial inks. The silver and palladium are in the form of the powdered metals or oxides and the other metals are in the form of oxides and silicates. Before drying and firing, the inks also contain a solvent, usually about 18.9 to about 29.3% by weight. This may be butyl or ethyl carbitol acetate. The inks also contain an organic binder, usually ethyl cellulose. The binder usually comprises about 2–6% of the dry weight (after solvent removal) of the composition. The metals other than the silver and palladium are present as constituents of the glass frit portion of the inks.

The precise chemical composition of the ink has no bearing on the invention. The invention can be practiced with any screen-printable ink. Inks containing ruthenium or thallium instead of palladium have also been used.

Screen printing may be done with a 200 mesh screen. If the mesh is too large, the wires or threads between the openings may be too large to permit rapid coalescence into a uniform layer.

Drying time is preferably at least 7 minutes at room temperature. A minimum time must be given to permit the separated dots of composition present immediately after the screen is lifted to coalesce into a continuous layer.

Because of the added degree of control it gives over the resistor manufacturing process and the fact that it adds little or nothing to manufacturing cost, the present process is a valuable tool in the hands of the hybrid circuit maker.

What is claimed is:

1. In a method of making a thick-film resistor which comprises:
   - screen printing on a heat resistant, insulating substrate, a composition comprising a mixture of metal or metal oxide particles, a glass frit, a temporary organic binder and a temporary solvent,
   - permitting said printed composition to stand at ambient conditions for a certain time consisting of the time between the printing step and a subsequent firing step, and
   - firing said composition to fuse said frit and burn off said binder,
   - the steps of:
   - determining the relationship between the resistivity of the fired resistor composition and the time the printed composition is permitted to stand between printing and the beginning of the firing cycle,
   - selecting a desired resistivity, and
   - adjusting the length of said time the printed composition is permitted to stand between printing and firing so as to obtain the desired resistivity.

2. A method according to claim 1 including the further steps of monitoring resistivity of the fired resistors as they are produced and, as the resistivity drifts away from the desired value, adjusting the length of said time the printed composition is permitted to stand between printing and firing to bring the resistivity of subsequently fired resistors back to the desired value.

3. A method according to claim 1 in which the screen printing is done with a screen of about 200 mesh and said time the printed composition is permitted to stand between printing and firing is at least 7 minutes.

4. A method according to claim 1 in which the solvent constitutes about 18.9 to 29.3% by weight of the printed-on composition.

5. A method according to claim 4 in which the amount of said binder is about 2–6% by weight of the composition after solvent removal.

* * * * *